Sheet 1, 3 Sheets.

T. V. Weymoth.

Envelope Mach.

No. 2,010. Reissued May 21, 1867.

Witnesses:

S. D. Law

Fred B. Sears

Inventors.

N. C. Berlin

Geo. H. Jones

Sheet 2, 3 Sheets

T. V. Weymoth.

Envelope Mach.

No. 2,616. Reissued May 21, 1867

Witnesses

T. P. Law

Fred B. Sears

Inventors

N. C. Berlin

Geo. N. Jones

Sheet 3, 3 Sheets.
T. V. Weymoth.
BEST AVAILABLE COPY
Envelope Mach.
No. 2,016. Reissued May 21, 1867.
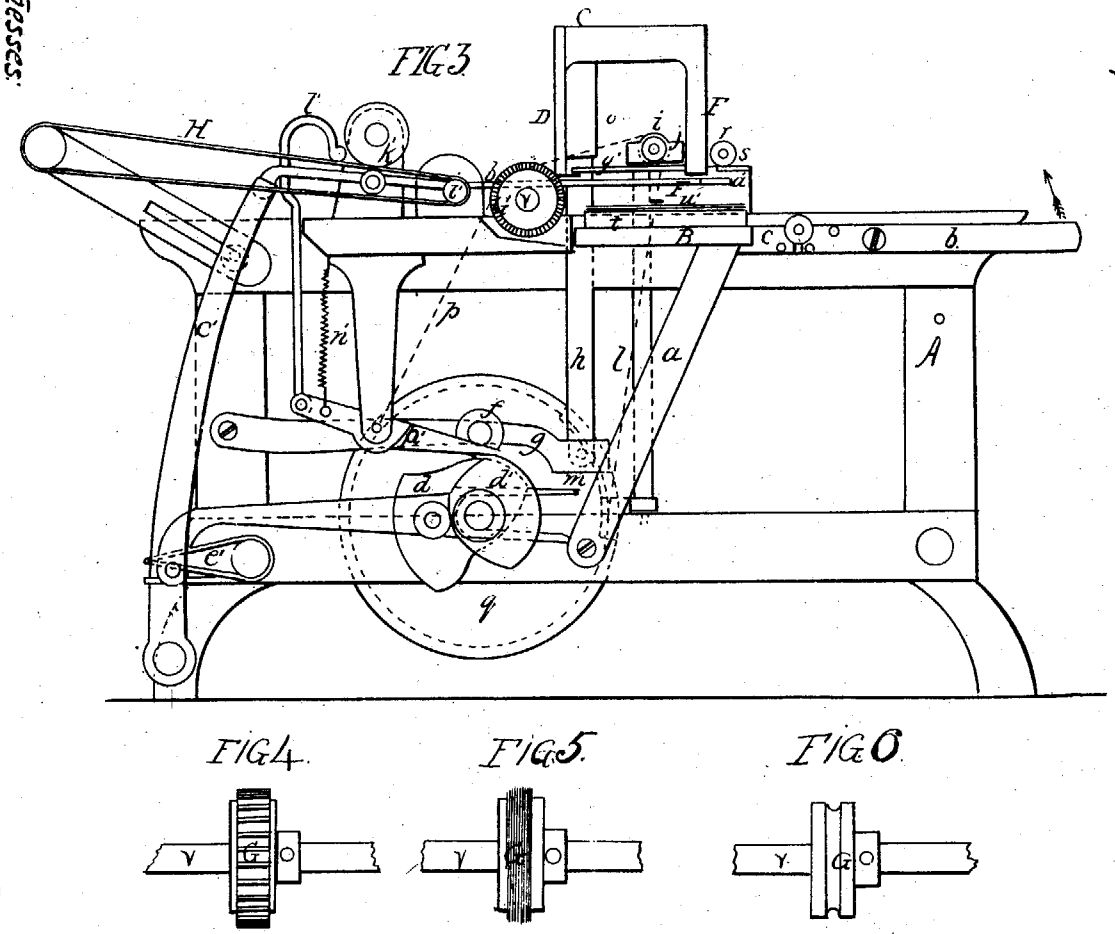
Witnesses:
J. D. Law
Fred B. Sears
Inventors:
N. C. Bealin
Geo. H. Jones

United States Patent Office.

HENRY C. BERLIN AND GEORGE H. JONES, ASSIGNEES OF THOMAS V. WAYMOTH, OF NEW YORK, N. Y.

*Letters Patent No.* 55,562, *dated June* 12, 1866; *reissue No.* 2,366, *dated September* 25, 1866; *reissue No.* 2,616, *dated May* 21, 1867.

BEST AVAILABLE COPY

BEST AVAILABLE COPY

MACHINE FOR GUMMING AND PRINTING ENVELOPES.

The Schedule referred to in these Letters Patent and making part of the same.

TO ALL WHOM IT MAY CONCERN:

Be it known that THOMAS V. WAYMOTH, of the city and county of New York, and State of New York, has invented a new and improved Machine for Gumming and Printing Envelopes, and that the following is a full, clear, and exact description thereof, and of its mode or manner of operation, reference being had to the accompanying drawings, and to the letters of reference marked thereon, and making a part of this specification.

This invention relates to a machine designed more particularly for gumming the seal-flaps, so called, of the blanks for envelopes, wrappers, and other similar articles, combined with suitable mechanism for separating the blanks from each other as they are gummed, and for taking the blanks after they are gummed, and carrying them away to dry, in such a manner that the gummed surfaces of the blanks will not lap upon and adhere to each other while the gum is being dried. The blanks may also be printed while being gummed, if desired.

Figure 3 is a similar section in the same plane, looking in the opposite direction from fig. 2.

Figures 4, 5, 6, are detached views of various modifications of the movable friction-separator.

Similar letters of reference indicate like parts.

Figure 1:
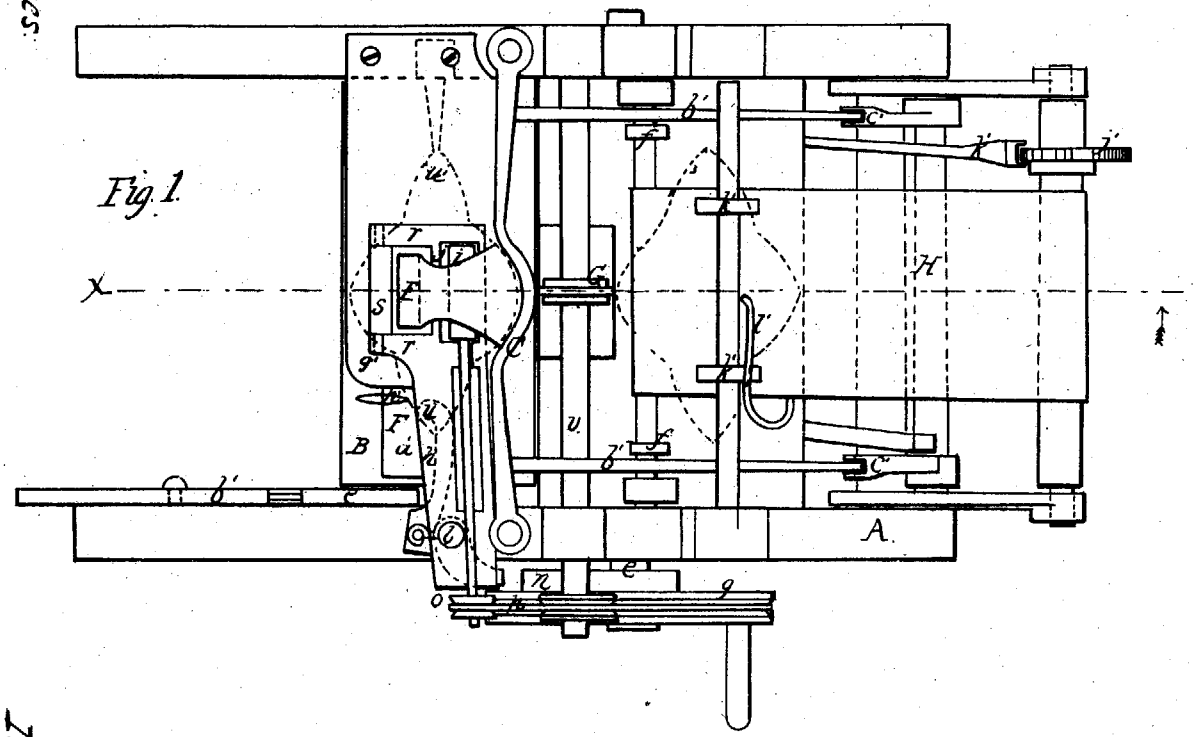
Figure 1 represents a plan or top view of such machine.
Figure 2:
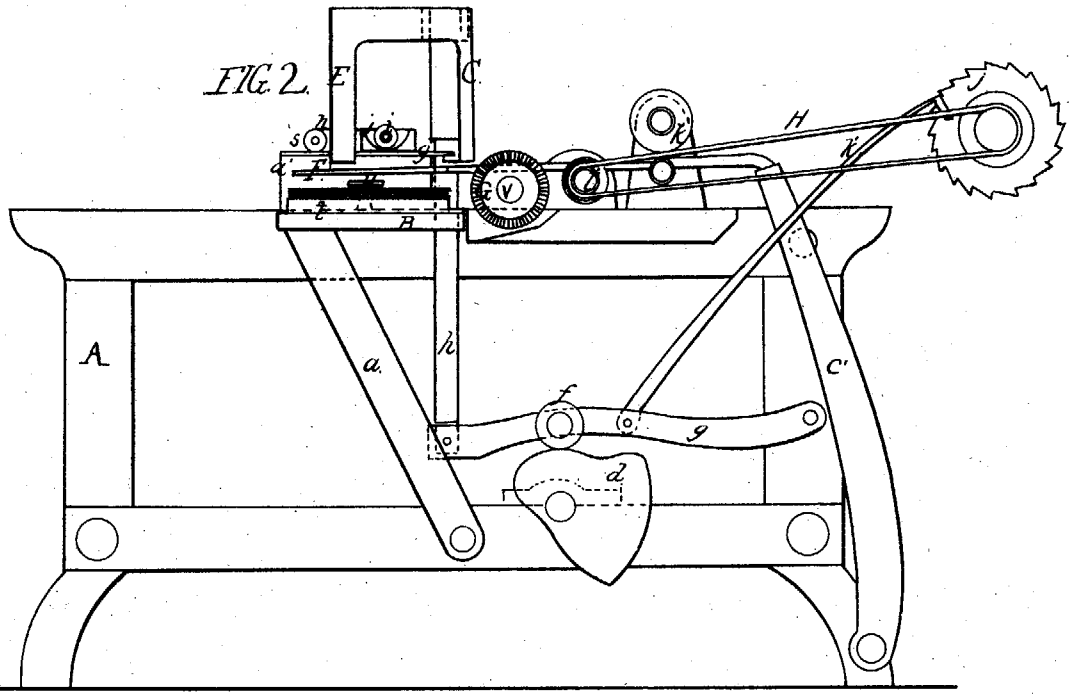
Figure 2 is a longitudinal vertical section of the same, taken in the line *x x*, fig. 1, and looking in the direction of the arrow near that line.

A represents a frame, made of iron or any other suitable material of sufficient strength to form the bearings for the various working parts of the machine. The blanks to be gummed and printed, or gummed without printing, are supported by a table, B, which rests on two arms or legs, *a*, that are hinged to the frame A so that the table can be raised up to a horizontal position, as shown in figs. 2 and 3, to support the blanks while being gummed, or gummed and printed, or can be turned or moved back from under the picker or gummer to an inclined position, to receive a fresh supply of blanks, whenever necessary, and without stopping or interfering with the motion of the picker or gummer. Such table is elevated or moved by a lever, *b*, which is pivoted to the frame A, and the inner end of which connects by a link, *c*, with the table. When such lever and link are in line, as shown in fig. 3, they form a brace, which retains the table in its horizontal position, but by lifting or turning up the lever *b* in the direction of the arrow marked opposite to it, in fig. 3, the table is made to swing or move back so as to conveniently receive the blanks. Above the table B, when in a horizontal position, rises the yoke C, to which a rising and falling motion is imparted by the action of cams *d* on the driving-shaft *e*, such cams being arranged so that they act on roller-studs *f*, secured to levers *g*, which are pivoted at one end to the frame A, their other ends connecting with the guide-rods *h* of the yoke C. This yoke carries the gummer D, and also the type-case E, or, if desired, the type-case may be connected to a separate yoke. The extent of movement of the yoke and gummer is such that the gummer will descend quite to the surface of the table, so that a single blank can be gummed. When a pile or number of blanks is on the table, the gummer is arrested in its descent by the blanks, and rests thereon, stopping short of its full motion. The face of the gummer D is supplied with gum by means of a roller, *i*, the axle of which has its bearings in the ends of the gum-box *j*, and this box is secured to an arm, *k*, which is hinged to a vertical arbor, V, to which an oscillating motion is imparted by means of a cam, *m*, acting on a tappet, *n*, as shown in fig. 3. By the oscillating motion of the arbor V the roller *i* is made to sweep across the face of the gummer D, whenever said gummer reaches its highest position, by the action of the cam *d* elevating the yoke C, and to cause the roller to transfer the requisite supply of gum to the gummer, a revolving motion is imparted to such roller by extending its axle beyond the arm *k*, so as to obtain room for a small pulley, *o*. A belt, *p*, stretched over said pulley, and over a pulley, *q*, on the driving-shaft, transmits the desired motion from this last-named shaft to the gum-roller *i*. This belt may be made of India rubber or other elastic material, which will act as a spring to carry the arm K and gum-roller *i* back to their original position, as soon as the cam *m* ceases to act on the tappet *n*, or, if desired, a suitable tightening-roller may be applied to the belt *p*, so that the same will be enabled to accommodate itself to the varying position of the pulley *o* on the axle of the gum-roller *i*. The arm *k* is provided with two legs or projections, *r*, which form the bearings for the ink-rollers *s*, which are intended to transfer the requisite quantity of printing ink to the types in the type-case E. This roller receives its supply of ink from a suitable ink-well, which is not shown in the drawings.

In order to facilitate the operation of transferring the gum from the gummer to the blanks, and particularly to facilitate the operation of printing, an elastic bed, *t*, made of thick India-rubber cloth or other suitable material, is placed on the table B, under the pile of blanks, and this bed may be cut out to correspond to the shape of the blanks, or it may be made in any desirable form or shape. By the action of the gummer D being brought down upon the blanks by the descent of the yoke, and then carried up again, one blank after another is lifted off from the pile and delivered to the reciprocating carrier F, as hereafter described. The separation of each blank from the pile is facilitated by weak springs, *u*, which bear down on the ends of such blanks, causing them to be bent as the gummer or picker raises them up, and a perfect separation of the blanks one from another is insured by the movable separator G, which consists of a brush or ratchet-wheel mounted on a shaft, *v*, to which a rapid revolving motion is imparted by the belt *p*, which also serves to impart motion to the gum-roller *i*, or, instead of a brush or ratchet-wheel, an endless apron or belt may be employed, stretched over suitable pulleys, and which may be armed with suitable teeth or wings. Such separator moves in close proximity to the edges of the blanks, so that by its action, and the action of the current of air created by its motion, the blanks are effectually separated one from another, and only one blank at a time lifted from the pile by the gummer, and delivered to the carrier. The carrier F consists of a platform, *a'*, which is supported by two arms, *b'*, extending from upright levers *c'*, to which an oscillating motion is imparted by the combined action of the cams *d'*, and a spring, *e'*. Such arms *b'* are supported and guided by grooved rollers, and their motion is so timed that the carrier is made to pass under the gummer, and the blank picked up by it, as soon as the gummer has been raised enough to admit the same. At that point the gummer stops, retaining the blank raised by it, so that the carrier may pass between the same and the pile of blanks on the table B. After the carrier has so passed under the gummer and reached its extreme position, it stops for a short time and the gummer resumes its ascent, thereby bringing the blank in contact with or against the guard *g'*, causing it to be disengaged from the gummer and drop down upon the carrier. Such carrier is provided with two hooks, *h'*, which catch over the edge of the blank or against which the edge of the blank rests, to prevent it slipping off the carrier. Immediately after the blank has been so deposited on the carrier, the latter moves back from under the gummer, and carries the blank over and deposits it upon the endless apron H. The table B may also be allowed to move with the pile of blanks from under the gummer, after the latter has descended, so as to give more space for the movement of the carrier. The endless apron H, which may be of a single piece of cloth, or a succession of tapes, or their equivalent, is stretched over two rollers, *i'*, which have their bearings in suitable boxes or standards secured to the frame A. On one of these rollers is mounted a ratchet-wheel, *j'*, and a pawl, *k'*, which engages with the teeth of said ratchet-wheel, and imparts to it and the roller to which it is fixed, and to the endless apron passing over such roller, an intermittent motion. Said pawl is pivoted to one of the levers *g*, which connect with the guide-rods of the yoke C, and to such pawl an intermittent motion is imparted by the cam *d*, (see fig. 2,) or the requisite motion may be imparted to it in any other suitable manner. This action of the pawl upon the ratchet-wheel, and the consequent intermittent movement of the endless apron, takes place while another blank is being gummed and carried to and deposited on the endless apron. As the carrier arrives at the back end of its stroke, over the inner end of the endless apron, the edge of the blank resting on the same is caught between two pairs of pressure-rollers, *k'*, situated above and below the apron in such a position that the same are caused to revolve by the action of the apron, and thus compel the blank to move along with said apron without fail. After the motion of the apron has been completed, a finger, *c'*, descends and presses upon the blank just delivered, so as to prevent it being disturbed in its position by the next succeeding stroke of the carrier. A rising and falling motion is imparted to such finger by the combined action of the spring *m* and cam *d*, which act on a double-armed lever, *p'*, to one end of which the finger is connected as shown in fig. 3. The motion of the endless apron H is so regulated that the same travels a distance equal to the width on the gummed space of the blanks, after the delivery of each blank, so that the gummed surface of one blank will not be covered by or permitted to come in contact with the succeeding blank, thus preventing such blanks sticking together, and giving ample time to the gummed surface to dry.

By this machine the seal-flaps of the blanks for envelopes can be gummed in a simple, quick, and effective manner; and simultaneously with the operation of applying the gum, any desired words or characters can be printed on the blank. The same machine can also be used with advantage for gumming and printing the blanks of newspaper wrappers or of any similar article.

What is claimed as the invention of the said THOMAS V. WAYMOTH, and is desired to be protected by Letters Patent, is—

1. The construction and operation of the hinged table B, substantially as and for the purposes set forth.

2. The operation of the movable separator G, or its equivalent, in combination with the gummer D, substantially as and for the purposes set forth.

3. The combination of the gummer D and reciprocating carrier F, or its equivalent, and the endless apron H, or its equivalent, arranged and operating substantially as and for the purposes set forth.

4. Imparting an intermittent motion, by suitable mechanism, to the endless apron H, or its equivalent, when combined with a reciprocating carrier, F, and gummer D, for the purpose set forth.

5. The operation of the rollers *k'* and finger *l'*, separately or together, in combination with the endless apron H and carrier F, substantially as and for the purposes set forth.

6. Gumming the seal-flap of an envelope or similar blank by a gummer which performs the double office of gumming the blank and raising or holding it stationary, in combination with any suitable mechanism to receive the blanks, one after another, after they have been gummed, and carry away such blanks, so gummed, in such a manner that the gummed portions will be prevented from lying upon or overlapping each other while drying, for the purpose set forth.

H. C. BERLIN,
GEO. H. JONES.

Witnesses:
S. D. LAW,
FRED. B. SEARS.